United States Patent
Hohmann et al.

(10) Patent No.: US 6,217,276 B1
(45) Date of Patent: Apr. 17, 2001

(54) DEVICE FOR NESTING TACO SHELLS

(76) Inventors: Franciscus Hohmann, Waldecklaan 10, NL-1213 XX Hilversum; Gert Jan Rein Leppink, Franse Kampweg 1 NL-1243 JC's, Graveland, both of (NL)

( * ) Notice: Subject to any disclaimer, the term of this patent is extended or adjusted under 35 U.S.C. 154(b) by 0 days.

(21) Appl. No.: 09/423,751
(22) PCT Filed: Mar. 16, 1999
(86) PCT No.: PCT/NL99/00145
§ 371 Date: Mar. 13, 2000
§ 102(e) Date: Mar. 13, 2000
(87) PCT Pub. No.: WO99/47422
PCT Pub. Date: Sep. 23, 1999

(30) Foreign Application Priority Data

Mar. 16, 1998 (NL) .................................................. 1008607

(51) Int. Cl.⁷ ..................................................... B65B 25/00
(52) U.S. Cl. ..................... 414/798.7; 53/542; 414/790.4; 414/798.4
(58) Field of Search ........................... 53/542; 414/790.4, 414/798.4, 798.7, 788.2

(56) References Cited

U.S. PATENT DOCUMENTS

| | | | |
|---|---|---|---|
| 2,206,228 | * 7/1940 | Henry | 414/798.7 X |
| 4,384,439 | * 5/1983 | Brown | 414/798.4 X |
| 4,753,336 | 6/1988 | Taylor et al. | 198/560 |
| 4,760,775 | 8/1988 | Hoskins | 99/353 |
| 5,002,457 | * 3/1991 | Dorner | 414/798.7 X |
| 5,122,029 | * 6/1992 | DelDuca | 414/788.2 X |

FOREIGN PATENT DOCUMENTS 2 095 744   2/1972   (FR) .
212 564  *  4/1967   (SE) .................. 414/790.4

* cited by examiner

*Primary Examiner*—Janice L. Krizek
(74) *Attorney, Agent, or Firm*—Young & Thompson

(57) ABSTRACT

The invention relates to a device for nesting taco shells, comprising: a stop for positioning a first taco shell, a pusher for urging taco shells toward the stop, pusher drive means for moving the pusher reciprocally relative to the stop, and control means for causing the minimum mutual distance between the stop and the pusher to increase stepwise during successive strokes of the pusher during making of a nest of taco shells. The invention also relates to a method of nesting taco shells.

13 Claims, 2 Drawing Sheets

DEVICE FOR NESTING TACO SHELLS

Figure 1A:
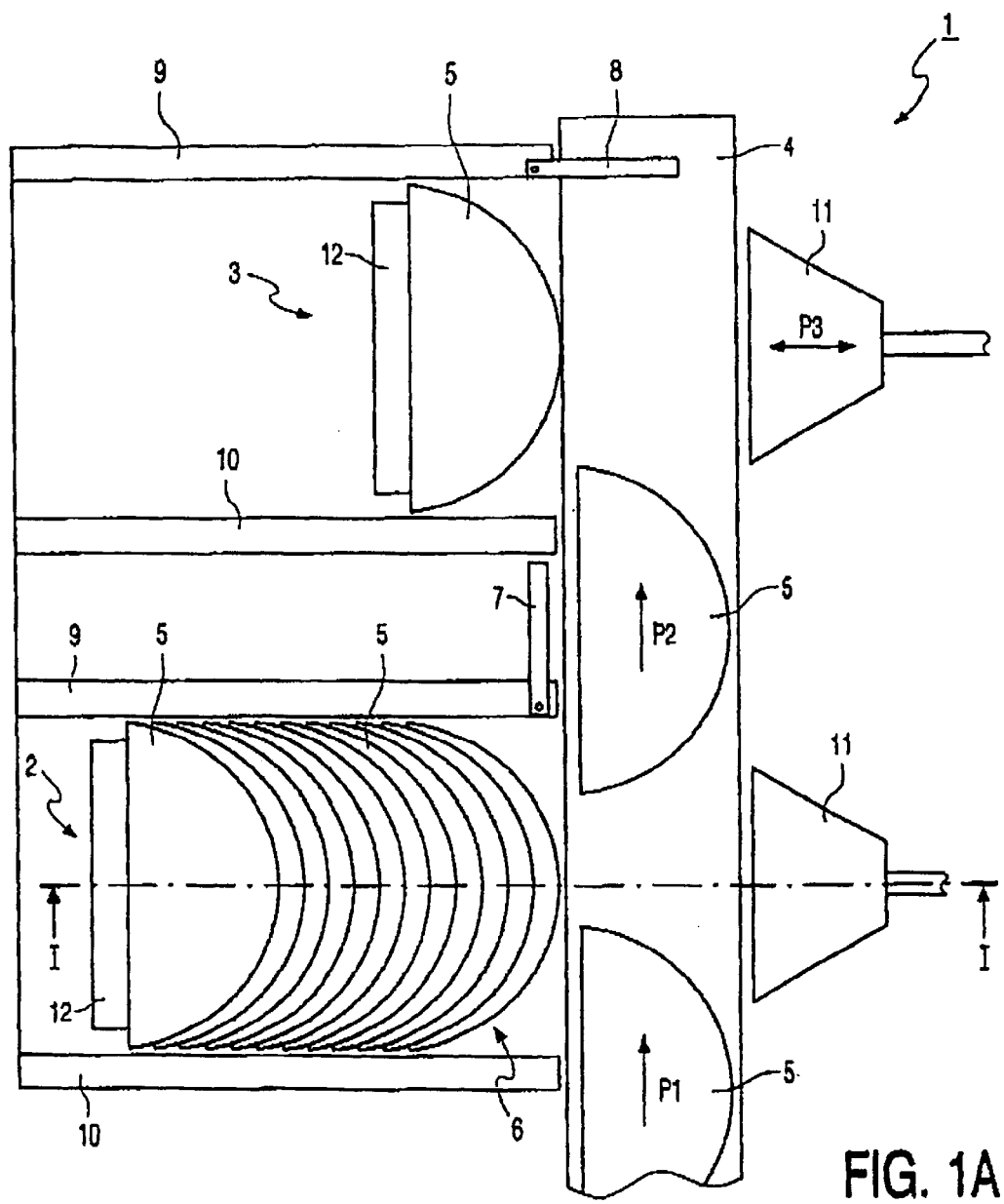

The invention relates to a device for nesting taco shells and a multiple nesting device.

Taco shells are deep-fried, thin cornmeal pancakes (tortillas) which as a result of deep-frying have a hard form with a spatial structure for receiving food products. In order to limit the volume of the packaged hard taco shells during transport and storage, they are nested.

The American patent U.S. Pat. No. 4,753,336 describes a packing machine for taco shells in which taco shells are displaced at mutual intermediate distances over a conveyor belt. For nesting of the taco shells a stabilization member is moved toward the belt to hold a first taco shell in a stationary position while the belt continues to run. Following shells transported by the belt will run up against the stationary shell, whereby they are nested. As soon as the nest of taco shells contains sufficient shells, the stabilization member will be moved in order to release the nest of taco shells. This very simple nesting device has the significant drawback that the positions of the individual taco shells in the nest to be formed as well as the final form of the nest are not precisely controllable.

The present invention has for its object to provide an improved device for nesting taco shells, whereby the positions of the individual taco shells in a nest and the final form of the nest are controllable.

The invention provides for this purpose a device for nesting taco shells wherein, by urging a following taco shell into a fixed taco shell with a pusher the mutual position of the taco shells in a nest can be fully controlled. Irrespective of the exact shape of the taco shells, which will of course differ slightly, the end position into which a taco shell is urged in a nest is determined by the end position of the pusher.

In a preferred embodiment the control means are coupled to the pusher drive means to cause the minimum distance between the pusher and the stop to increase stepwise during successive strokes during making of a nest of taco shells. Successive taco shells can be placed one after another in the nest by varying the stroke length. The stroke length will herein decrease with each successively placed taco shell.

In another preferred embodiment the control means are coupled to stop drive means for stepwise displacement of the stop during successive strokes during making of a nest of taco shells. The stroke length of the pusher can now remain the same during placing of successive taco shells; the additional space required for the already finished part of the nest of taco shells is obtained by stepwise displacement of the stop away from the pusher. It is not therefore necessary when arranging the first taco shells in a nest to have the pusher make a comparatively long stroke. This has a time-saving effect.

The device is preferably provided with supply means for supplying taco shells for nesting which for instance lie substantially perpendicularly of the path of movement of the pusher. The nesting device can thus be rigidly coupled to a taco deep-fryer from which the taco shells are transported, with intermediate spacing, to the nesting device. When the supply means comprise a supply stop for taco shells with which supplied taco shells can be positioned in the path of movement of the pusher, the taco shells can be engaged by the pusher when they lie against the supply stop. A prerequisite here is that the taco shells are supplied at mutual intervals such that the reciprocating stroke of the pusher is at least practically completed at the moment a following taco shell lies against the supply stop.

The invention also provides a multiple nesting device with at least two single nesting devices as described above. This multiple nesting device can be provided with single supply means for sequential supply of taco shells to the individual nesting devices. When a nest of taco shells has been formed in a first nesting device, it must be removed. In order to prevent this removal of the nest resulting in capacity limitations, it is recommended to give the nesting device a multiple form so that supplied taco shells can be nested in another nesting device while a finished nest of taco shells is removed from the filled nesting device. An additional advantage is that switch-overs and/or maintenance of the multiple nesting device do not necessarily result directly in loss of capacity.

In a preferred embodiment the single nesting devices or nesting stations successively adjoin the supply means and each nesting station is provided with a separate supply stop for taco shells with which supplied taco shells can be positioned in the path of movement of the pusher of the associated nesting station, wherein at least one supply stop is displaceable between a stop position and a release position for supplied taco shells. Depending on the position of the supply stop of the first nesting station adjoining the supply means, the taco shells will run up against the stop and then be nested or, when the stop is in the release position, they will pass by the nesting station. When a determined nesting station has been filled or otherwise does not have to be used for nesting, the associated supply stop must be placed in the release position. When the supply stop is in the release position the reciprocating movement of the pusher can be halted simultaneously. The supplied taco shells will run on to the first nesting station adjoining the supply means and having a supply stop situated in the stop position.

In another preferred embodiment the nesting stations of a multiple nesting device are located in a displaceable holder which can be connected onto the supply means by displacing the individual nesting stations. It is thus possible for the nesting stations to be located radially in a holder wheel or placed parallel to a rotation axis of a holder wheel. Such a multiple nesting device has the advantage that it can take a compact form, i.e. without very elongate supply means. An additional advantage is that other operations can be carried out on a nest of taco shells, wherein only one extra processing station is required. It is possible here to envisage placing of a strengthening element in the last arranged shell of a nest of taco shells and/or arranging of a packaging round a nest of taco shells.

In a multiple nesting device with displaceable holder in which the nesting devices are situated, a single stop can co-act with the individual nesting stations. A single pusher can also co-act with the individual nesting stations. The advantage hereof is that despite the presence of a plurality of nesting stations only a single stop and a single pusher are required.

Figure 1B:
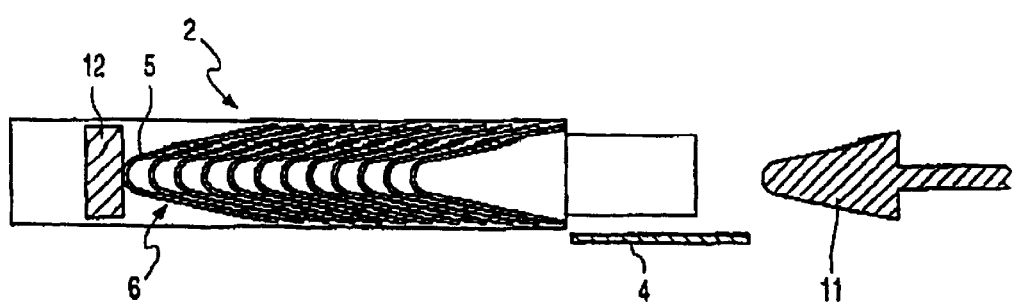
Figure 2:
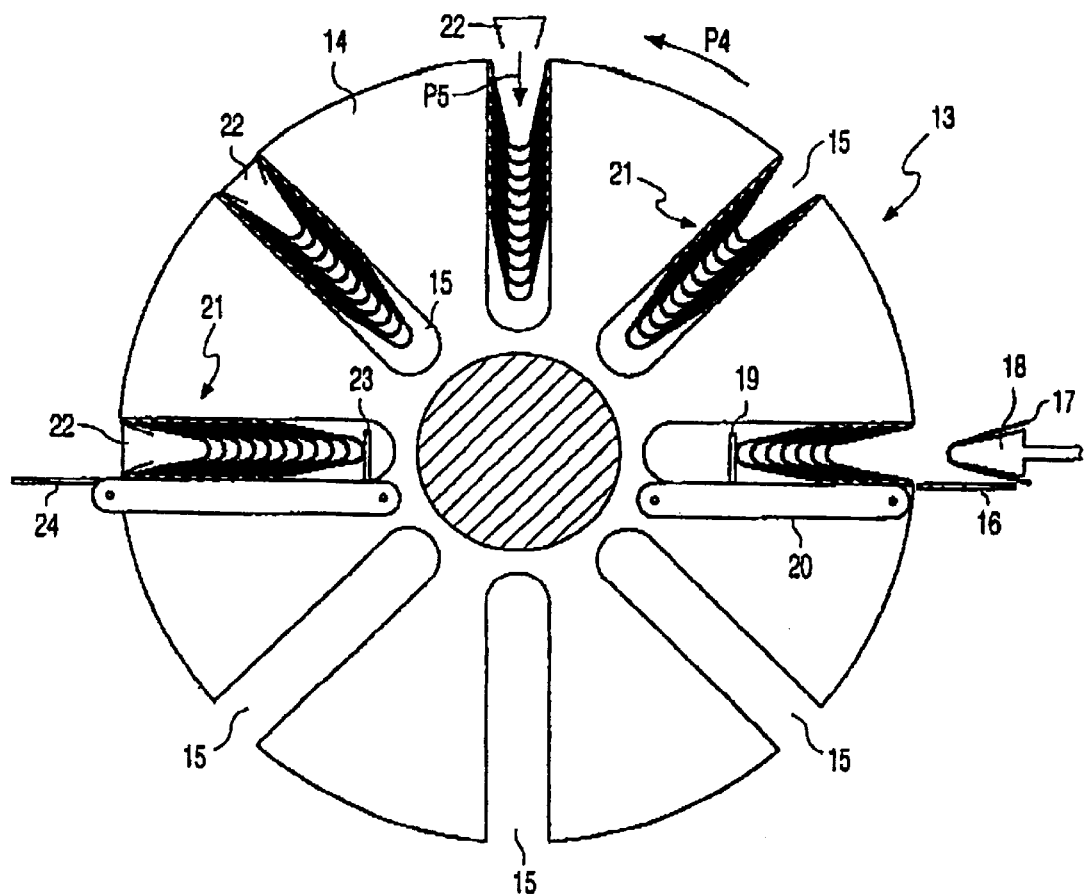
Figure 3:
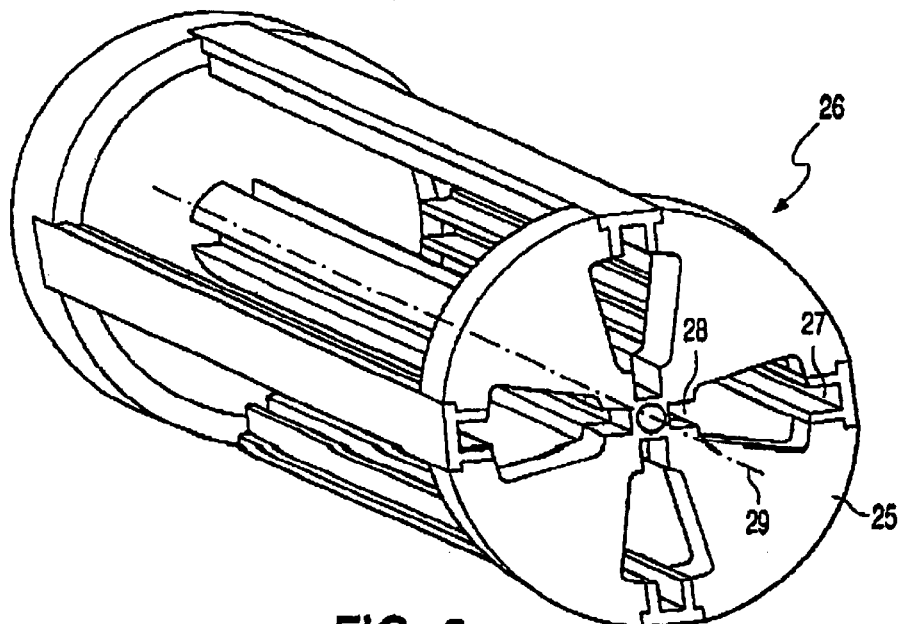

The present invention will be further elucidated with reference to the non-limitative embodiments shown in the following figures. Herein:

FIG. 1A shows a schematic top view of a dual nesting device according to the invention, FIG. 1B shows a cross-section through the nesting device shown in FIG. 1A along the line 1—1, FIG. 2 is a schematic side view of a section through a multiple nesting device with a rotatable holder in which are located radial nesting stations, and FIG. 3 is a schematic perspective view of a multiple nesting station provided with a rotatable holder in which nesting stations are located parallel to the rotation axis of the holder.

FIG. 1 shows a double nesting device 1 with a first nesting station 2 and a second nesting station 3. Taco shells 5 are supplied at mutual intermediate distances by a conveyor belt 4 as according to arrow P1. Since first nesting station 2 is filled with a nest 6 consisting of twelve taco shells 5, a supply stop 7 of first nesting station 2 is swung aside such that a following taco shell 5 can pass through.

Taco shells 5 supplied by conveyor belt 4 are carried further as according to arrow P2 until they lie against supply stop 8 of second nesting station 3. Supply stop 8 connects onto a lateral guide 9. Running parallel to lateral guide 9 is a second lateral guide 10, between which guides the taco shells 5 can be displaced by a pusher 11. Pusher 11 is reciprocally movable as according to arrow P3. In the shown situation one taco shell 5 is situated in second nesting station 3 and a following taco shell 5 is being supplied by conveyor belt 4. So as to allow through the following taco shell 5 the pusher 11 must be moved so far to the right that it allows free passage to the following taco shell 5.

Just as first nesting station 2, second nesting station 3 is provided with a stop 12 which is displaced stepwise to the left as successive taco shells 5 are pushed in by pusher 11. Stop 12 and pusher 11 bound at each stroke the maximum length of the nest of taco shells 5 formed up to that point. The maximal length of a nest of taco shells 6 can thus be controlled with device 1. A nest of taco shells 6 will have practically straight sides due to the lateral guides 9, 10.

In a variant (not shown) of the double nesting device 1 supply stop 8 is can also be swung aside to allow through taco shells 5. In the case of malfunction or other production-limiting conditions at the two nesting stations 2, 3, both supply stops 7, 8 can then be swung aside such that supplied taco shells 5 do not accumulate in front of second nesting station 3. A collecting bin can for instance be placed at the end of conveyor belt 4 to collect the unprocessed taco shells 5.

FIG. 1B shows first nesting station 2 in cross-section, wherein it is clearly shown that conveyor belt 4 is left clear by pusher 11. Taco shells 5 are nested such that they are situated in nest 6 at practically equal mutual distances. In order to prepare nesting station 2 for making a subsequent nest 6, the finished nest 6 must be removed from station 2 and supply stop 7 displaced such that it blocks convey or belt 4 at the position of lateral guide 9 of first nesting station 2. In practice this will usually be left until a nest 6 is finished in second nesting station 3.

FIG. 2 shows an eight-fold nesting device 13 with a rotatable holder 14 in which are arranged eight radial nesting stations 15. Taco shells 17 are supplied by a conveyor belt 16, here shown in cross-section. The radial nesting station 15 in the right-hand horizontal position can be filled with taco shells 17 by pusher 18. This latter takes a single form so that all eight nesting stations 15 can be filled with the same pusher 18. A displaceable nest stop 19 also takes a single form. Stop 19 is displaceable stepwise as successive taco shells 17 are placed. For this purpose the stop 19 is connected for instance to the stop drive 20, here shown schematically. When the radial nesting station 15 furthest to the right contains a full nest of taco shells 21 and pusher 18 lies clear of this nest 21, holder 14 can be carried through forty-five degrees as according to arrow 4. The following radial nesting station 15 can now be filled by pusher 18.

Other processing stations can also be placed round the rotatable holder 14, for instance for packing a nest of taco shells 21 and/or for placing a strengthening element 22 in the final taco shell 17 of a nest 21. This is shown schematically here by means of arrow P5.

Nesting station 15 situated in the left-hand horizontal position can be emptied by means of a nest discharge 23 such that the nest of taco shells 21 with a strengthening element 22 arranged therein is placed on a discharge conveyor 24.

As FIG. 2, FIG. 3 shows a rotatable holder 25, although this figure relates to a four-fold nesting device 26. In this nesting device 26 the taco shells are laterally secured in each case by two co-acting guides 27, 28 which run parallel to the rotation axis 29 of holder 25. The advantage of the rotatable holder 25 as shown in this figure compared to the rotatable holder 14 as shown in FIG. 2 is that nests of taco shells are secured in radial direction. For the operation of a pusher 18 and stop 19 reference is made to FIG. 2.

Removal of a nest of taco shells from holder 25 is also shown in FIG. 2 with reference to nest discharge 23. It will be apparent that the four-fold nesting device 26 must be provided with a pusher 18, stop 19 and nest discharge 23 in order to be able to function. Four-fold nesting device 26 can also be combined with other processing stations, for instance for packing a nest of taco shells 21 and/or for placing a strengthening element 22 as shown in FIG. 2.

What is claimed is:

1. Device for nesting taco shells, comprising:
    a stop for positioning a first taco shell,
    a pusher for urging taco shells toward the stop,
    pusher drive means for moving the pusher reciprocally relative to the stop, and
    control means for causing the minimum mutual distance between the stop and the pusher to increase stepwise with successive strokes of the pusher during making of a nest of taco shells.

2. Nesting device as claimed in claim 1, wherein the control means are coupled to the pusher drive means to cause the minimum distance between the pusher and the stop to increase stepwise during successive strokes during making of a nest of taco shells.

3. Nesting device as claimed in claim 1, wherein the control means are coupled to stop drive means for stepwise displacement of the stop during successive strokes of the pusher during making of a nest of taco shells.

4. Nesting device as claimed in claim 1, wherein the device is provided with supply means for supplying the taco shells for nesting.

5. Nesting device as claimed in claim 4, wherein the supply direction of the supply means lies substantially perpendicularly of the path of movement of the pusher.

6. Nesting device as claimed in claim 5, wherein the supply means comprise a supply stop for taco shells with which supplied taco shells can be positioned in the path of movement of the pusher.

7. A device for nesting taco shells, comprising at least two nesting stations as claimed in claim 1, wherein this device comprises single supply means for sequential supply of taco shells to individual said nesting stations.

8. A nesting device as claimed in claim 7, wherein said nesting stations successively adjoin the supply means and each nesting station comprises a separate supply stop for taco shells with which supplied taco shells can be positioned in the path of movement of the pusher of the associated nesting station, and wherein at least one supply stop is displaceable between a stop position and a release position for supplied taco shells.

9. A nesting device as claimed in claim 7, wherein said nesting stations are located in a displaceable holder, by displacing of which the individual nesting stations can be connected onto the supply means.

10. A nesting device as claimed in claim 9, wherein said nesting stations are located radially in a holder wheel.

11. A nesting device as claimed in claim 9, wherein said nesting stations are located symmetrically to the rotation axis in a holder wheel.

12. A nesting device as claimed in claims 9, wherein a single supply stop co-acts with said individual nesting stations.

13. A nesting device as claimed in claim 1, wherein a single pusher co-acts with said individual nesting stations.

* * * * *